United States Patent [19]

Alfio

[11] 4,177,755
[45] Dec. 11, 1979

[54] APPARATUS FOR DUSTING AN ELASTOMERIC SURFACE

[75] Inventor: Deregibus Alfio, Padua, Italy

[73] Assignee: The Goodyear Tire & Rubber Company, Akron, Ohio

[21] Appl. No.: 841,786

[22] Filed: Oct. 13, 1977

[30] Foreign Application Priority Data

Apr. 5, 1977 [IT] Italy ................................ 23159 A/77

[51] Int. Cl.² .......................... B05C 5/00; B05C 11/02
[52] U.S. Cl. .................................... 118/118; 118/415
[58] Field of Search ............... 118/415, 118, 119, 109, 118/308

[56] References Cited

U.S. PATENT DOCUMENTS

| | | | |
|---|---|---|---|
| 1,586,892 | 6/1926 | Fischer | 118/415 X |
| 2,354,113 | 7/1944 | Gould | 118/119 X |
| 2,507,294 | 5/1950 | Barkstrom et al. | 178/415 X |
| 2,755,196 | 7/1956 | Scholl | 118/415 X |

*Primary Examiner*—John P. McIntosh
*Attorney, Agent, or Firm*—R. S. Washburn

[57] ABSTRACT

In apparatus for dusting an exposed upper elastomeric surface of a fabric reinforced vulcanizable tape, the tape is entrained about rollers such that a horizontal portion passes below at least one slit, of a feedbox containing zinc stearate, for spreading of the powder evenly on the tape, whereafter on a downstream portion of the tape which is inclined upwardly a brush serves to remove any excess powder from the dusted tape.

2 Claims, 2 Drawing Figures

APPARATUS FOR DUSTING AN ELASTOMERIC SURFACE

BACKGROUND OF THE INVENTION

1. Field of the Invention

This invention relates to apparatus for producing continuous tapes in natural or synthetic rubber, which can be vulcanized, and their arrangement into bobbins for the manufacture of articles, in particular hose. More specifically, this invention refers to means for the production of rubberized fabric tapes, or rubber tapes "reinforced" by a textile structure. In other words, this invention concerns means for the coating with rubber or the coupling with a layer of natural or synthetic vulcanizable rubber, of a fabric tape, in order to form the tapes into bobbins.

More specifically, this invention concerns equipment adapted to constitute an operative element or unit of a complete plant for the manufacture of pieces of hose, of great length, in natural or synthetic rubber, such a plant being the subject of another contemporaneous application by the same applicant, to whose context reference is herein made, for the better inderstanding of some of the technical and industrial features of this invention.

2. Description of the Prior Art

A characteristic condition of the preparation of these continuous tapes is that they must be provided with a superficial coat of zinc stearate or other anti-adhesive material, for raw rubber, in such a way as to prevent, during winding of these tapes into bobbins, that the adjacent turns adhere to one another, which would prevent or present difficulties in the course of their successive unwinding. The presence of the stearate or equivalent product on these materials does not cause drawbacks in the course of the vulcanizing process on the condition, however, that it is used in very limited quantities and, above all, that it does not penetrate to the bottom of the textile layer, stopping its porosity.

SUMMARY OF THE INVENTION

It has been established by the Applicant that these conditions can be properly observed, with advantages both in the handling of the tapes and, above all, for the qualitative characteristics of the semi-finished products and of the hose and, in any case, of the final industrial products, when carrying out the "talcing" (this expression, although inexact, is traditionally used in the art, in that it recalls the traditional application or dusting with talc of the components of vulcanized rubber) of the tapes on condition that:

the quantity of stearate is limited and measured precisely and that this quantity is applied exclusively to the surface of the tape which is composed of the layer of raw rubber coated on the fabric.

It has also been established that the presence of the measured dose of zinc stearate on the surface formed by the rubber is sufficient for the formation of an interfacial layer between the adjacent turns of the bobbins, in order to assure that it can be unwound easily, without the transference of the stearate to the next turn composed of the fabric.

These and other more specific characteristics of the invention will appear more evident in the course of the following detailed description of a preferred embodiment with reference to the accompanying drawings;

DESCRIPTION OF THE PREFERRED EMBODIMENT

Figure 1:
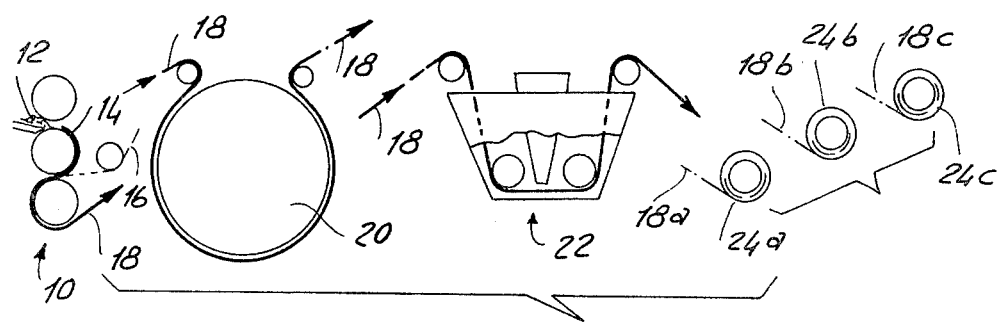
FIG. 1 shows schematically a portion of a complete production line, including the apparatus of the invention.

With particular reference to the figures in the drawing:

as schematically illustrated in FIG. 1, a procedure for the formation of these tapes and the assembly of them into bobbins comprises a sequence carried out by means of a first device 10—for laminating and calandering, in which a mixture of vulcanizable rubber 12 (natural or synthetic) is laminated around a pair of calandering cylinders, so as to form a rubber tape 14, which is then coupled to a fabric tape 16, so as to form the desired rubberized fabric 18, or reinforced rubber tape. This rubberized fabric 18, having been previously cooled by means of coming into contact, over a large part of the circumference of at least one refrigerated drum 20, is then made to pass through a device 22 for the application, under the characteristic conditions described below, of a thin layer or film of zinc stearate, on only one surface of the tape. As it particularly concerns a linenized tape, or rubberized fabric 18, this application is carried out on the surface made up of rubber. The tapelike material thus treated is then sent to be wound into bobbins. Given that the tape-like material to begin with is generally produced as a primary tape of considerable width, this tape is cut longitudinally, by cutting or tearing or lacerating (in the known way), and subdivided into a number of adjacent narrower tapes 18a, 18b, 18c and 18d (FIG. 2) individually wound into bobbins 24a, 24b . . . , preferably but not necessarily by means of procedures and devices which are subject of other contemporaneous patent applications, by the same Applicant.

Figure 2:
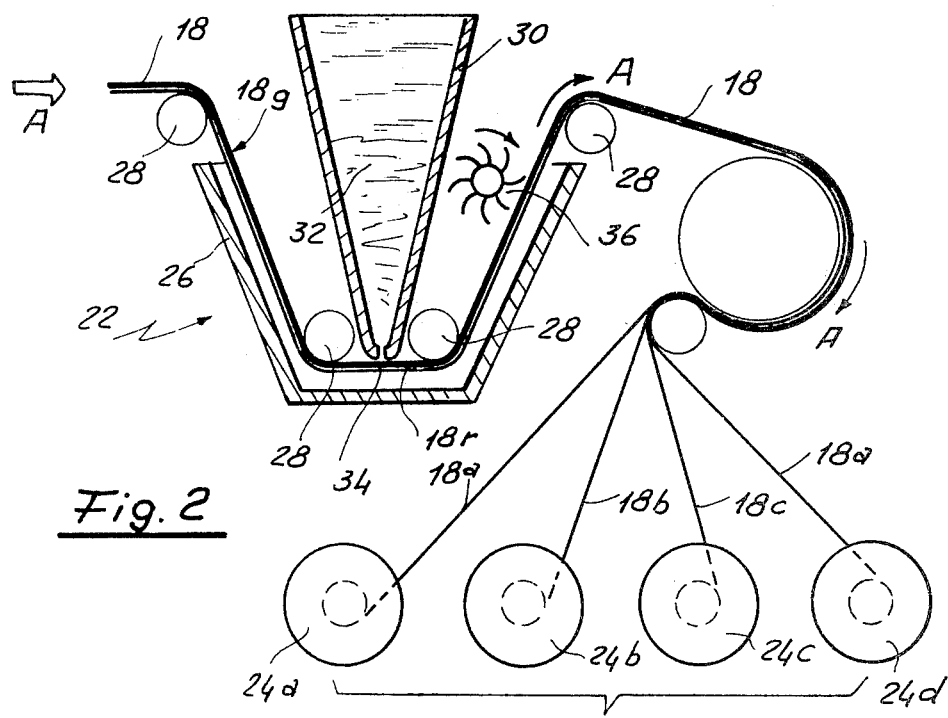
FIG. 2 shows the apparatus of the invention in vertical section.

The features of the device 22, are shown in greater detail, in FIG. 2.

This device comprises a receiver or container open along the top 26, into which the tape 18, with its rubberized surface 18g facing upwards, is made to advance along a predetermined path, by means of a number of guiding and returning rollers 28, this path following a horizontal or approximately horizontal line 18r, near the bottom of the said container 26, and along which the said rubberized surface 18g still faces upwards.

The zinc stearate is regularly measured and applied to the said rubberized surface, in particular by descending through a feedbox 30, in which a sufficient quantity 32 of zinc stearate descends by gravity to emerge in measured quantities through a lower opening 34, preferably through slits, or a number of aligned orifices, to be placed on said rubberized surface 18g of the material advancing, in direction A.

The control of the uniform distribution of the zinc stearate and the removal of any possible excess of the zinc applied, are assured by the presence and the activity of at least one rotating brush 36, counter-rotating in relation to the direction A of the advancing tape-like material, and operating on an ascending stretch of its path, after the application point of the stearate, at 34. Suitable means of aspiration can be arranged in order to carry away the particles of stearate left in the atmosphere.

The apparatus could be integrated with auxiliary means and devices in particular adapted to assure regular descent of the zinc stearate in the said feedbox 30. For example, this feedbox could be integrated with a suitable vibrator and/or agitating system, such as paddles, scrolls or the like, which can be arranged and operated on the inside of the feedbox, so as to make the mass of stearate 32 agitate and to prevent localized blockage. The exit orifice 34 could also be integrated with means adapted to vary its cross section, so as to predetermine its output.

I claim:

1. Apparatus, for the application of a film of zinc stearate powder onto tape incorporating textile material and having a layer of vulcanizable elastomer exposed at one face of the tape, comprising:

(i) first and second roller means about which said tape may be entrained with the elastomer face thereof contacting said roller means, the roller means being spaced and positioned such that a portion of said tape between the roller means is substantially horizontal and has the elastomer face exposed upwardly; p1 (ii) a feedbox, to contain zinc stearate powder, having at its lower part at least one slit positioned transversely of the tape and extending for the entire width of the tape for the emergence of the zinc stearate powder, said feedbox being disposed with its lower part positioned between said first and second roller means and closely spaced above said substantially horizontal portion of said tape, for even distribution of zinc stearate dust onto said tape portion;

(iii) third roller means, at a level above that of the first and second roller means, about which said tape may be entrained such that a further portion of said tape, downstream of said substantially horizontal portion thereof and between said second and third roller means, is inclined upwardly, and (iv) brush means disposed to contact the stearate-dusted face of said further tape portion between said second and third roller means, for the removal from said further tape portion of any excess stearate dust thereon.

2. Apparatus, as claimed in claim 1, further comprising an open-topped container in which said first and second roller means, the lower part of said feedbox, and said brush means are disposed, and fourth roller means disposed at a level above said container and about which said tape may be entrained such that an upstream portion of said tape between said fourth roller means and said first roller means is downwardly inclined.

* * * * *